US012558776B2

(12) United States Patent (10) Patent No.: US 12,558,776 B2
Chou et al. (45) Date of Patent: Feb. 24, 2026

(54) CONTROLLING A ROBOT TO REMEDY A PROBLEM

(71) Applicant: NORTHROP GRUMMAN SYSTEMS CORPORATION, Falls Church, VA (US)

(72) Inventors: Sibo Chou, Melbourne, FL (US); Daniel W. Plawecki, Melbourne, FL (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 522 days.

(21) Appl. No.: 17/831,106

(22) Filed: Jun. 2, 2022

(65) Prior Publication Data

US 2023/0390922 A1 Dec. 7, 2023

(51) Int. Cl.
B25J 9/16 (2006.01)
(52) U.S. Cl.
CPC ... B25J 9/1602 (2013.01); *G05B 2219/39001* (2013.01); *G05B 2219/40251* (2013.01)
(58) Field of Classification Search
CPC ........ B25J 9/1602; B25J 9/163; B25J 9/1664; G05B 2219/39001; G05B 2219/40251;
(Continued)

(56) References Cited

U.S. PATENT DOCUMENTS

| | | | | |
|---|---|---|---|---|
| 6,651,045 B1 * | 11/2003 | Macaulay | ............... | H04M 3/51 706/45 |
| 8,648,867 B2 * | 2/2014 | Gorchetchnikov | ... | G06F 9/5027 345/503 |

(Continued)

FOREIGN PATENT DOCUMENTS

| | | |
|---|---|---|
| CN | 105425970 B1 | 3/2016 |
| CN | 106649524 B | 11/2019 |

(Continued)

OTHER PUBLICATIONS

Written Opinion International Search Report (WOISR) from corresponding PCT/US2023/015389, mailed Jun. 6, 2023.

(Continued)

*Primary Examiner* — Sihar A Karwan
(74) *Attorney, Agent, or Firm* — KATTEN MUCHIN ROSENMAN LLP

(57) ABSTRACT

A robot intelligence engine receives highly immersive virtual environment (HIVE) data characterizing a set of robot tasks executed by a test robot in a HIVE, wherein the robot tasks of the set of robot tasks include a robot skill. The robot intelligence engine receives sensor data from a problem detecting robot deployed in an environment of operation that characterizes conditions corresponding to a detected problem and searches the set of robot tasks to identify a subset of the robot tasks that are potentially employable to remedy the detected problem. The robot intelligence engine simulates the subset of robot tasks to determine a likelihood of success for the subset of robot tasks. The simulation generates a set of unsupervised robot tasks that are potentially employable to remedy the detected problem. The robot intelligence engine selects one of the subset of robot tasks or one of the unsupervised robot tasks.

22 Claims, 4 Drawing Sheets

(58) Field of Classification Search
        CPC .......... G05B 2219/40113; G05B 2219/40395;
                        G05B 2219/40009; G05B 2219/45085;
                        G06N 3/09; G06N 3/092; G06N 3/088
        See application file for complete search history.

(56) References Cited

U.S. PATENT DOCUMENTS

| | | | |
|---|---|---|---|
| 9,189,828 B2 | 11/2015 | Gorchetchnikov et al. | |
| 9,239,951 B2 * | 1/2016 | Hoffberg | G06F 9/453 |
| 9,573,276 B2 * | 2/2017 | Stephens, Jr. | B64G 4/00 |
| 10,963,231 B1 * | 3/2021 | Singh | G06F 8/60 |
| 2006/0167917 A1 * | 7/2006 | Solomon | G05B 19/418 |
| 2010/0017026 A1 * | 1/2010 | Fletcher | G05D 1/0044 |
| | | | 901/46 |
| 2017/0282371 A1 * | 10/2017 | Erhart | G06Q 30/016 |
| 2020/0171671 A1 * | 6/2020 | Huang | B25J 9/0084 |
| 2021/0109834 A1 * | 4/2021 | Singh | G06F 17/18 |
| 2022/0043561 A1 * | 2/2022 | Washington | B25J 19/023 |
| 2022/0281123 A1 * | 9/2022 | Robbins | B25J 9/1671 |

FOREIGN PATENT DOCUMENTS

| | | |
|---|---|---|
| CN | 110769071 A | 2/2020 |
| CN | 112295145 A | 2/2021 |

OTHER PUBLICATIONS

Jones, et al.: "Using Supervised Learning to Compensate for High Latency in Planetary Exploration"; 2017 IEEE Aerospace Conference, IEEE, Mar. 4, 2017 (Mar. 4, 2017), pp. 1-7, XP033103035, DOI: 10.1109/AER0.2017.7943980 [retrieved on Jun. 7, 2017]; whole document.

\* cited by examiner

400

405
RECEIVE HIVE DATA

410
RECEIVE SENSOR DATA

415
DETERMINE CAUSE OF PROBLEM

420
SEARCH ROBOT TASKS IN SUPERVISED LEARNING DATABASE

425
SIMULATE ROBOT TASKS

430
SELECT ROBOT TASK

435
SET PRIORITY OF SELECTED ROBOT TASK

440
DEPLOY ROBOT TO REMEDY PROBLEM

CONTROLLING A ROBOT TO REMEDY A PROBLEM

TECHNICAL FIELD

The present disclosure relates to controlling robots to remedy detected problems.

BACKGROUND

Machine learning (ML) is the study of computer algorithms that can improve automatically through experience and by the use of data. Machine learning is seen as a part of artificial intelligence. Machine learning algorithms build a model based on sample data, known as training data, in order to make predictions or decisions without being explicitly programmed to do so. Machine learning algorithms are used in a wide variety of applications, such as in medicine, email filtering, speech recognition, and computer vision, where it is difficult or unfeasible to develop conventional algorithms to perform the needed tasks.

Robot learning is a research field at the intersection of machine learning and robotics. Robot learning studies techniques enabling a robot to acquire novel skills or adapt to its environment through machine learning algorithms. The physical instantiation of the robot, situated in a physical embedding, provides at the same time specific difficulties (e.g. high-dimensionality, real time constraints for collecting data and learning) and opportunities for guiding the learning process (e.g. sensorimotor synergies, motor primitives). Examples of skills that are targeted by machine learning algorithms include sensorimotor skills such as locomotion, grasping, active object categorization, as well as interactive skills such as joint manipulation of an object with a human peer, and linguistic skills such as the grounded and situated meaning of human language. Robot learning can happen either through autonomous self-exploration or through guidance from a human teacher.

SUMMARY

One example relates to a system for controlling operations of robots. The system includes a non-transitory memory for storing machine-readable instructions and a processing unit that accesses the memory and executes the machine-readable instructions. The machine-readable instructions include a robot intelligence engine that receives highly immersive virtual environment (HIVE) data characterizing a set of robot tasks executed by a test robot in a HIVE, wherein the robot tasks of the set of robot tasks include at least one robot skill. The robot intelligence engine also receives sensor data from a problem detecting robot deployed in an environment of operation that characterizes conditions corresponding to a detected problem and searches the set of robot tasks to identify a subset of the robot tasks that are potentially employable to remedy the detected problem. The robot intelligence engine simulates the subset of robot tasks to determine a likelihood of success for the subset of robot tasks. The simulation generates a set of unsupervised robot tasks that are potentially employable to remedy the detected problem. The robot intelligence engine selects one of the subset of robot tasks or one of the unsupervised robot tasks to determine a selected robot task for remedying the detected problem and provides the selected robot task to a deployed robot operating in the environment of operation causing the deployed robot to execute the selected robot task to attempt to remedy the problem.

Another example relates to a non-transitory machine-readable medium having machine-readable instructions, the machine-readable instructions comprising a robot intelligence engine that receives HIVE data characterizing a set of robot tasks executed by a test robot in a HIVE, wherein the robot tasks of the set of robot tasks include at least one robot skill. The robot intelligence engine receives sensor data from a problem detecting robot deployed in an environment of operation that characterizes conditions corresponding to a detected problem and searches the set of robot tasks to determine if a subset of the robot tasks are potentially employable to remedy the detected problem. The robot intelligence engine simulates the subset of robot tasks to determine a likelihood of success for the subset of robot tasks. The simulation generates a set of unsupervised robot tasks that are potentially employable to remedy the detected problem. The robot intelligence engine selects one of the subset of robot tasks or one of the unsupervised robot tasks to determine a selected robot task for remedying the detected problem and selects a deployed robot in the environment of operation to remedy the detected problem. The robot intelligence engine provides the selected robot task to the selected deployed robot causing the selected deployed robot to execute the selected robot task to attempt to remedy the problem.

Yet another example relates to a method that includes receiving, at a robot intelligence engine operating on a computing platform, HIVE data characterizing a set of robot tasks executed by a test robot in a HIVE, wherein the robot tasks of the set of robot tasks include at least one robot skill. The method also includes receiving sensor data from a problem detecting robot deployed in an environment of operation that characterizes conditions corresponding to a detected problem and searching the set of robot tasks to identify a subset of the robot tasks that are potentially employable to remedy the detected problem. The method further includes simulating the subset of robot tasks to determine a likelihood of success for the subset of robot tasks, wherein the simulating generates a set of unsupervised robot tasks that are potentially employable to remedy the detected problem and selecting one of the subset of robot tasks or one of the unsupervised robot tasks to determine a selected robot task for remedying the detected problem. The method includes providing the selected robot task to a deployed robot causing the deployed robot to execute the selected robot task to attempt to remedy the problem.

DETAILED DESCRIPTION

Figure 1:
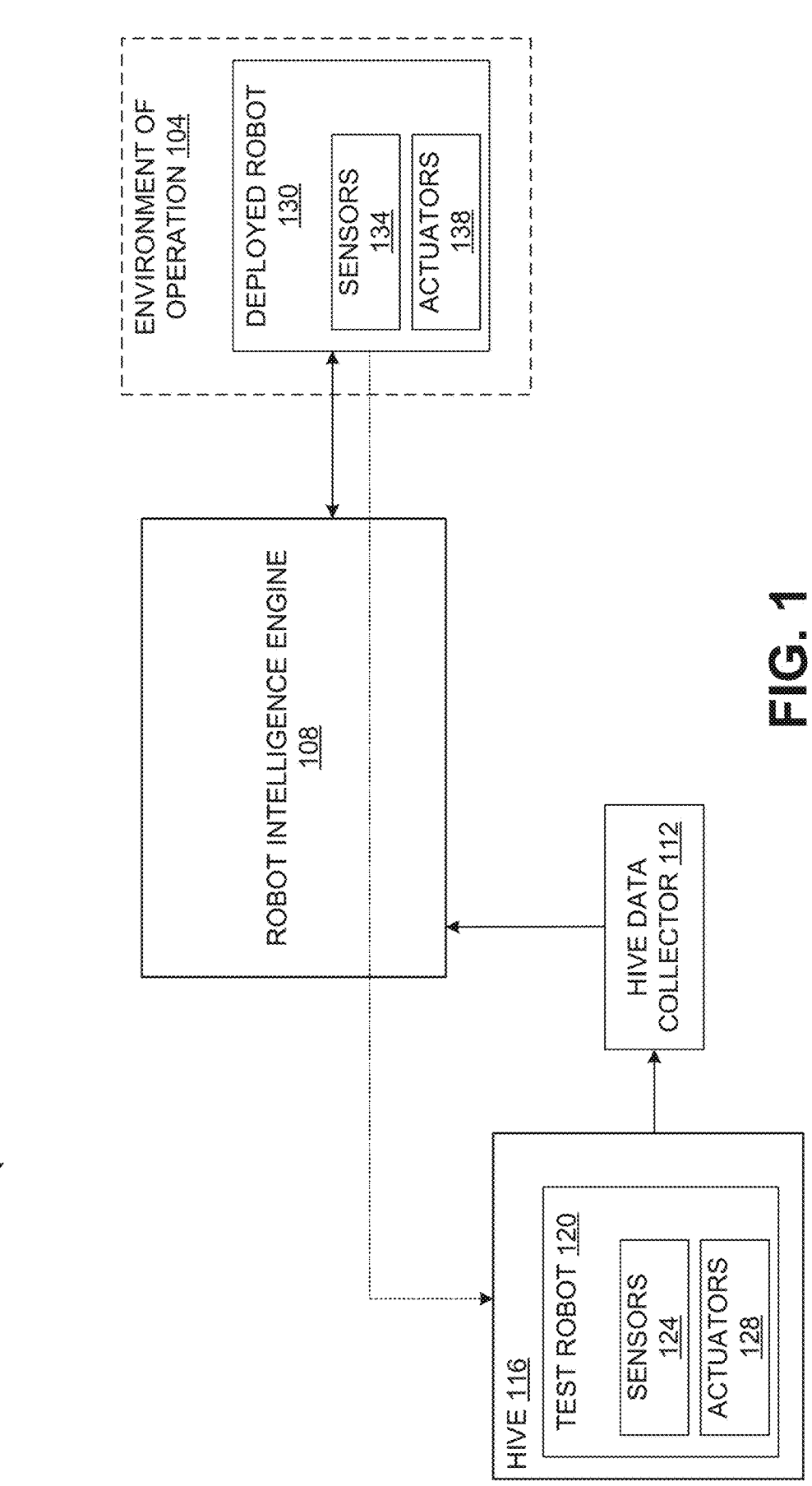
FIG. 1 illustrates an example of a system for controlling robots deployed in an environment of operation that is inhospitable to human life.

This description relates to a robot intelligence engine that controls robots operating in an environment of operation that is inhospitable to human life. This description describes methods for training robots with sufficient scenarios such that when/if an untrained scenario appears, artificial intelligence (AI) of the robots can formulate a remedy for detected problems. For example, the environment of operation can be an extraterrestrial environment of operation, such as the moon or Mars. The robot intelligence engine receives highly immersive virtual environment (HIVE) data characterizing a set of robot tasks executed by a test robot in a HIVE. The HIVE includes a motion capture system, which represents an experimental region (e.g., a laboratory) on earth that is employable to emulate conditions of the environment of operation. A HIVE data collector linked to the HIVE monitors operations within the HIVE and generates the HIVE data. In the HIVE, thousands or even millions of experiments are conducted with a test robot to generate and tune the robot tasks. During each such experiment, stimuli and/or disturbances can be applied to the test robot to emulate unexpected conditions in the environment of operation. For instance, to emulate a rock hitting a robot in the environment of operation, the test robot can be hit with a blunt object during execution of a robot task. The robot tasks include at least one robot skill. Each robot skill represents a primitive operation, such as tightening a screw, opening a door, etc. The robot intelligence engine parses the HIVE data and stores the set of robot tasks in a supervised learning database.

The robot intelligence engine receives sensor data from a problem detecting robot deployed in the environment of operation that characterizes conditions corresponding to a detected problem. In response to the data characterizing a problem, the robot intelligence engine searches the set of robot tasks to determine if a subset of the robot tasks are potentially employable to remedy the detected problem. In response to the subset of robot tasks, the robot intelligence engine simulates the subset of robot tasks to determine a likelihood of success in remedying the problem. In some examples, such simulation generates a set of unsupervised robot tasks that are potentially employable to remedy the detected problem.

The robot intelligence engine ranks the subset of robot tasks and the unsupervised robot tasks, and the robot intelligence engine selects one of the subset of robot tasks or one of the unsupervised robot tasks to determine a selected robot task for remedying the detected problem. The selected task, for example, has a highest rank. In such a situation, ranking of the robot tasks and the unsupervised robot tasks is based on criteria such as likelihood of success, availability of tools, etc.

In response to selecting a robot task, the robot intelligence engine assigns a priority to the selected robot task relative to other robot tasks that are being executed contemporaneously. Additionally, in response to determining a priority of the selected robot task, the robot intelligence engine determines a most capable robot within the environment of operation to remedy the problem. The robot intelligence engine provides the selected robot task to a deployed robot that is deemed the most capable causing the deployed robot to remedy the problem. In response, the deployed robot execute the selected robot task to attempt to remedy the problem.

In examples where the deployed robot executed an unsupervised robot task, the deployed robot provides feedback to the HIVE data collector characterizing the unsupervised robot task. In response, the HIVE data collector can instantiate conditions within the HIVE to implement experiments to tune the unsupervised robot task. Consequently, the unsupervised robot task can be converted to a (supervised) robot task for storage in the supervised learning database of the robot intelligence engine.

FIG. 1 illustrates an example of a system 100 for controlling robots deployed in an environment of operation 104 that is inhospitable to human life. In some examples, the environment of operation 104 is an extraterrestrial environment, such as the moon or Mars. In other examples, the environment of operation 104 is an environment on earth that is inhospitable to humans, such as underwater.

The system 100 includes a robot intelligence engine 108 that communicates with a HIVE data collector 112. The robot intelligence engine 108 and the HIVE data collector 112 represent application software executing on a computing platform. The HIVE data collector 112 communicates with a HIVE 116 that includes a test robot 120 operating therein. There could be hundreds of instances of the HIVE 116 (referred to as HIVE laboratories) with thousands of test robots being trained. For simplicity this description focuses on a single HIVE 116. The test robot 120 includes sensors 124 and actuators 128 for interacting with an environment within the HIVE 116. The sensors 124 can include, but are not limited to cameras, proximity sensors, pressure sensors, temperature sensors, accelerometers, etc. The actuators 128 are employable to activate moveable features on the test robot 120. In various examples, the actuators 128 can be motors, solenoids, pneumatic devices, etc.

The HIVE 116 provides a test environment for training the test robot 120. The HIVE 116 is an earth-based laboratory that creates conditions that are similar to the environment of operation 104. The HIVE data collector 112 monitors and controls operations of physical entities within the HIVE 116.

The HIVE 116 is employable to input multi-dimensional training skills data into the HIVE data collector 112. The HIVE 116 allows for a link between a real-time environment and a virtual environment. By immersing and comingling both the test robot 120 and physical equipment within the HIVE 116 along with interactions between the physical equipment and the test robot 120 in a virtual environment, data is collected by the HIVE data collector 112 that fully characterizes an interface between the test robot 120 and parts of the physical equipment.

This information is employable to tune robot tasks. For example, the HIVE 116 is employable to tune repair an air supply of a habitat based on numerous trials (e.g., thousands or even millions of trials) that include evolutions and experiences in the HIVE 116. During these trials, numerous instances of extraneous stimuli are applied to the test robot 120 in order to emulate the environment of operation 104. For example, during the trials, the test robot 120 may be hit with a blunt object to emulate a rock hitting a robot in the environment of operation 104. Similarly, a temperature of the HIVE 116 is adjusted to simulate a change in temperature of the environment of operation 104. Data for these robot tasks is collected by the HIVE data collector 112 and provided to the robot intelligence engine 108 (e.g., through a wireless network).

The robot intelligence engine 108 is configured/programmed to deploy robots within the environment of operation 104 to execute robot tasks based in part on HIVE data (e.g., raw data) received from the HIVE data collector 112. The robot intelligence engine 108 parses the HIVE data into usable data elements. For example, the HIVE data can be parsed into K number of different robot skills, where K is an integer greater than or equal to one. The K number of robot skills can include, but are not limited to primitive tasks such as tightening and/or loosen fasteners, connecting and/or disconnect wiring connectors and/or operating particular tools (e.g., laser cutter, saw, wrench, screwdriver etc.). The parsing of the HIVE data into classifications is employable to execute a different repair. Thus, the individual robot skills can be combined to execute a robot task.

The robot intelligence engine 108 includes a supervised learning database that stores R number of robot tasks executable by the test robot 120, where R is an integer greater than or equal to one. Each of the R number of robot tasks is comprised of one or more of the K number of robot skills. In many instances, the R number of robot tasks represents a combination of robot skills needed to complete a particular task.

The R number of robot tasks are based on the HIVE data provided from the HIVE data collector 112. The R number of robot tasks stored in a supervised learning database can be determined by a neural network or other machine learning algorithm operating on the robot intelligence engine 108 and/or the HIVE data collector 112. As some examples, the R number of robot tasks can include a robot task for repairing an air supply of a habitat and/or changing a battery of a rover.

As noted, the environment of operation 104 includes deployed robots. More specifically, the environment of operation 104 includes J number of deployed robots, where J is an integer greater than or equal to one. In the example illustrated, the environment of operation 104 includes a deployed robot 130, but in other examples there is more than one robot in the environment of operation 104. The deployed robot 130 includes sensors 134 and actuators 138. In some examples, the sensors 134 and/or the actuators 138 can be a subset of the sensors 124 and/or the actuators 128, respectively, of the test robot 120.

In the example provided, the deployed robot 130 employs the sensors 134 (or some subset thereof) and/or sensors from other nearby robots to obtain reading inputs in order to detect and locate a problem, and an area in which the problem exists. The sensors 134 can include, for example, cameras, electronic sensors, etc., similar to the sensors 124 of the test robot 120. The sensor data capturing the problem is sent to the robot intelligence engine 108. Moreover, in some examples, additional sensor data is collected until the robot intelligence engine 108 has sufficient information to identify the problem. In a first example (hereinafter, "the first example"), suppose that the deployed robot 130 detects an air leak in a habitat. In the first example, the deployed robot 130 swivels a camera (e.g., one of the sensors 134) to the area of the habitat. In this case of the first example, the deployed robot 130 is configured to determine if the habitat is damaged (e.g., cracked) causing the leak or if the air supply is leaking. If the sensors 134 (e.g., cameras) detect no observable abnormalities, the deployed robot 130 switches to another sensor 134 in order to collect additional data.

The data collected by the deployed robot 130 is provided to the robot intelligence engine 108. In response, the robot intelligence engine 108 diagnoses the problem. More specifically, as the robot intelligence engine 108 receives a stream of data from the deployed robot 130, the robot intelligence engine 108 conducts an evaluation and will start to characterize the data collected from the deployed robot 130 to determine a cause (alternatively referred to as a root cause) of the problem detected by the deployed robot 130. In particular, in the first example, the robot intelligence engine 108 can evaluate an image of the problem to determine which part(s) of the habitat is damaged. For instance, in the first example, the robot intelligence engine 108 can determine if the problem is caused by the habitat, the air supply, etc. The robot intelligence engine 108 can implement a machine learning based algorithm, such as a neural network (e.g., for image recognition) and/or a nearest neighbor algorithm. Continuing with the first example, suppose that the robot intelligence engine 108 determines that a crack in the habitat is causing the air leak.

In response to determining a cause of the problem, the robot intelligence engine 108 examines the problem and searches each robot task stored in the supervised learning database to determine if a subset of the R number of robot tasks stored in the supervised learning database at least partially addresses the problem. Continuing with the first example, the result of the search of the supervised learning database identifies a robot task wherein a patch is applied to the habitat over the detected crack. However, in the first example, suppose that the supervised learning database does not include a robot task that uses the size of patch available to the robot.

The robot intelligence engine 108 implements AI algorithms, such as reinforcement learning to simulate a robot (or multiple robots) implementing each task in the subset of robot tasks to determine a likelihood of success of each such task. More specifically, the robot intelligence engine 108 evaluates each robot task in the subset of robot tasks and executes numerous simulation scenarios applying reinforcement learning (and/or another AI technique) to tune a solution space based on criteria such as tools/spare parts availability, time availability, energy consumption/availability, repair success chance, impact to mission success, etc. In the first example, the robot intelligence engine 108 adjusts a robot task for applying a patch to the habitat to use two available smaller patches instead of a single larger patch.

Stated differently, the robot intelligence engine 108, in response to the subset of robot tasks, employs the AI algorithm to run millions of simulation scenarios applying various combinations of arm-only and wheel only repair procedures (e.g. arm repair, arm bending, arm soldering, etc.) to derivate various unsupervised solutions that have not previously been available (and/or even conceived) in the supervised learning database. The AI algorithm of the robot intelligence engine 108 employs criteria such as tools/spare parts availability, time availability, energy consumption/ availability, repair success percentage, impact to mission success, etc. to evaluate the results. Execution of the AI algorithm can provide additional unsupervised learned scenarios providing unsupervised robot tasks not previously available in the supervised learning database. These unsupervised robot tasks (e.g., potential solutions) are stored an in an unsupervised learning database accessible by the robot intelligence engine 108. In some examples, these unsupervised robot tasks are provided to the HIVE data collector 112, so that the HIVE data collector 112 can instantiate conditions within the HIVE 116 to emulate conditions present for the unsupervised robot tasks stored in the unsupervised learning database.

In response to the subset of robot tasks and the unsupervised robot tasks, the robot intelligence engine 108 employs an AI algorithm (e.g., a rules-based engine) and ranks the robot tasks and the unsupervised robot tasks based on criteria such as tools/spare parts availability, time availability, energy consumption/availability, repair success percentage, impact to mission success, etc. The robot intelligence engine 108 selects the robot task that is the top ranked solution.

In response to selecting the robot task as the top ranked solution, the robot intelligence engine 108 prioritizes the selected robot task with any other needed and/or contemporaneously executed repairs and prioritizes each such robot task based on criticality. For example, a robot arm (or arms) must be repaired prior to execution of any other robot tasks that require the use of the robot arm. In the first example, a robot arm would be needed to apply the patches to the habitat. Thus, if a repair of a robot arm is in the queue, the repair of the leak in the habitat may be given a lower priority.

In response to determining the top prioritized robot task, the robot intelligence engine 108 determines a most capable robot of the J number of deployed robots. The most capable robot can be based on geographic proximity, tool availablity, a status of the J number of robots, etc. For example, the robot nearest to the problem may not have the tools or spare parts to perform the repair, or the robot nearest the problem may have damaged arms. In the example where the robot nearest the problem as damaged arms, a robot second closest to the problem could be assigned the top priority robot task of repairing the arm of the robot closest to the problem. Further, in a situation where there is no robot available for deployment (e.g., all robots are busy with other robot tasks), a waitlist can be generated. Additionally, in the first example, repairing the air leak in the habitat would likely be given a priority of critical. Thus, in the first example, even if all of the robots are busy executing other robot tasks, the most capable robot can be re-assigned a robot task to repair the crack in the habitat.

In response to identifying the most capable robot, namely the deployed robot 130, the top prioritized robot task is assigned and provided to the deployed robot 130. In response to the top prioritized task, the deployed robot 130 executes the assigned robot task (e.g., the top prioritized robot task). Once the assigned robot task is successfully executed and if the repair was an unsupervised robot task, the assigned robot task is sent to the HIVE data collector 112 for evaluation in the HIVE 116. At a subsequent time, the HIVE data collector 112 can tune and validate the unsupervised robot task, thereby converting the unsupervised robot task into a (supervised) robot task for storage in the supervised learning database. Conversely, if the deployed robot 130 is not successful at remedying the problem, the assigned robot task is also sent back to the HIVE data collector 112, where the assigned robot task can be virtually analyzed, modified, and potentially become a new robot task for storage in the supervised learning database.

By employing the system 100, robots operating in the environment of operation 104 can be assigned to execute specific robot tasks to remedy problems. More particularly, the robot intelligence engine 108 can modify robot tasks stored in the supervised learning database to remedy problems that have not been addressed before. Additionally, these modified robot tasks (unsupervised robot tasks) are provided to the HIVE data collector 112 for testing and tuning in the HIVE 116. Accordingly, over time, the set of robot tasks in the supervised learning database of the robot intelligence engine 108 will grow. Additionally, as noted, the environment of operation 104 is inhospitable to human life. Thus, in situations where humans are deployed to the environment of operation 104, these humans would rely on operations of the deployed robots (including the deployed robot 130) to execute robot tasks to curtail danger to the humans. Further, in examples where the environment of operation 104 has a very large physical distance from the HIVE data collector 112 (e.g., the robot intelligence engine 108 is implemented in an extraterrestrial environment), it is not practical to attempt to have the HIVE data collector 112 tune robot tasks in real-time. Instead, the robot intelligence engine 108 is deployed in a region proximal to (or within) the environment of operation 104. For example, the robot intelligence engine 108 can be implemented in a satellite orbiting the environment of operation 104 or in a computing platform that is situated on a surface of the environment of operation 104.

Figure 2:
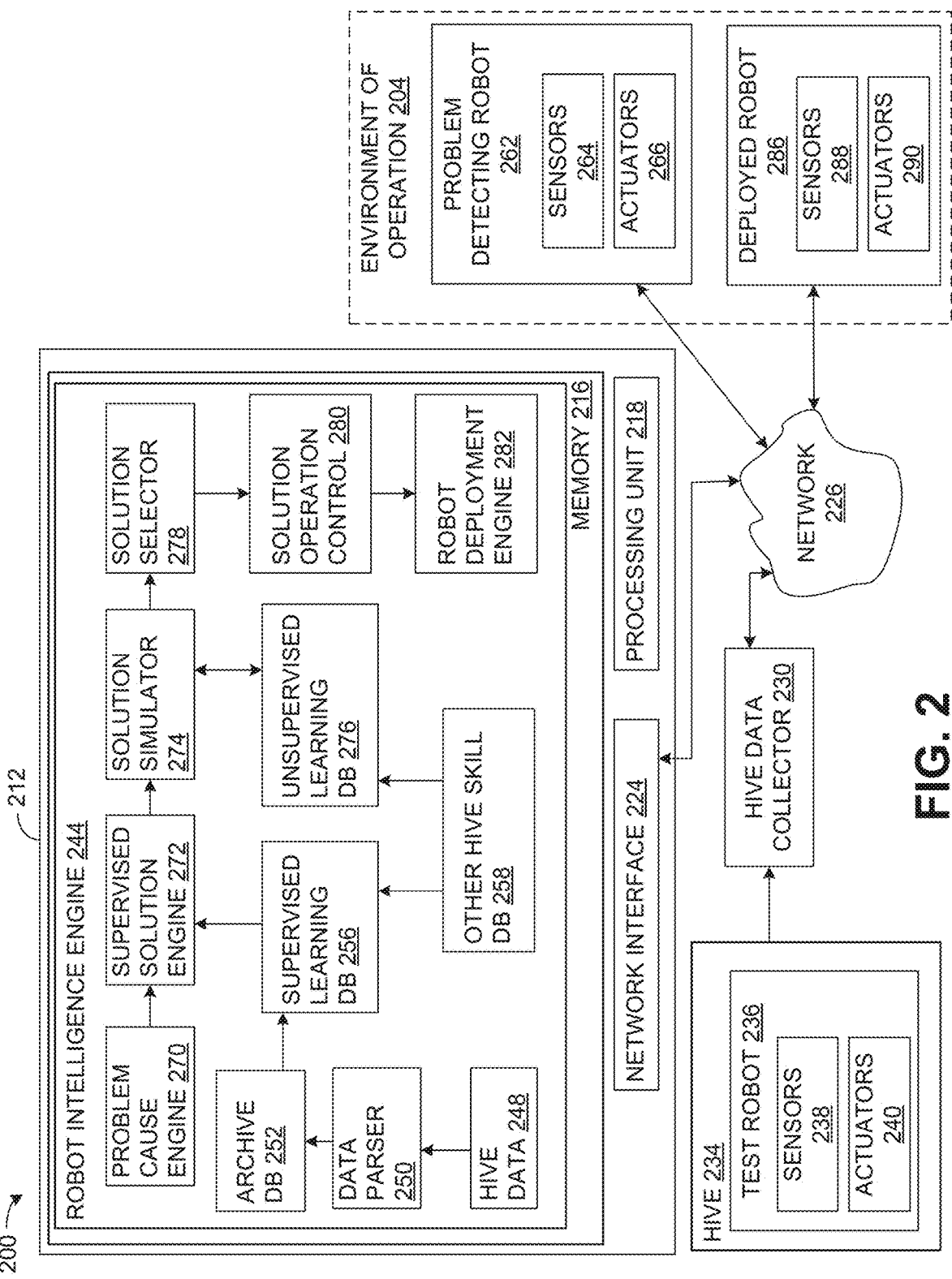
FIG. 2 illustrates another example of a system for controlling robots deployed in an environment of operation that is inhospitable to human life.

FIG. 2 illustrates an example of a system 200 for controlling robots deployed in an environment of operation 204 that is inhospitable to human life. In some examples, the environment of operation 204 is an extraterrestrial environment, such as the moon or Mars. In other examples, the environment of operation is an environment on earth that is inhospitable to humans, such as underwater. The system 200 can include a computing platform 212. Accordingly, the computing platform 212 can include a memory 216 for storing machine-readable instructions and data and a processing unit 218 for accessing the memory 216 and executing the machine-readable instructions. The memory 216 represents a non-transitory machine-readable memory (or other medium), such as RAM, a solid state drive, a hard disk drive or a combination thereof. The processing unit 218 can be implemented as one or more processor cores. The computing platform 212 can include a network interface 224 (e.g., a network interface card) configured to communicate with other computing platforms via a network 226, such as a public network (e.g., the Internet), a private network (e.g., a local area network (LAN)) or a combination thereof (e.g., a virtual private network). The network 226 can include both wired and wireless connections.

The computing platform 212 could be implemented in a computing cloud. In such a situation, features of the computing platform 212, such as the processing unit 218, the network interface 224, and the memory 216 could be representative of a single instance of hardware or multiple instances of hardware with applications executing across the multiple of instances (i.e., distributed) of hardware (e.g., computers, routers, memory, processors, or a combination thereof). Alternatively, the computing platform 212 could be implemented on a single dedicated server or workstation.

Figure 3A:
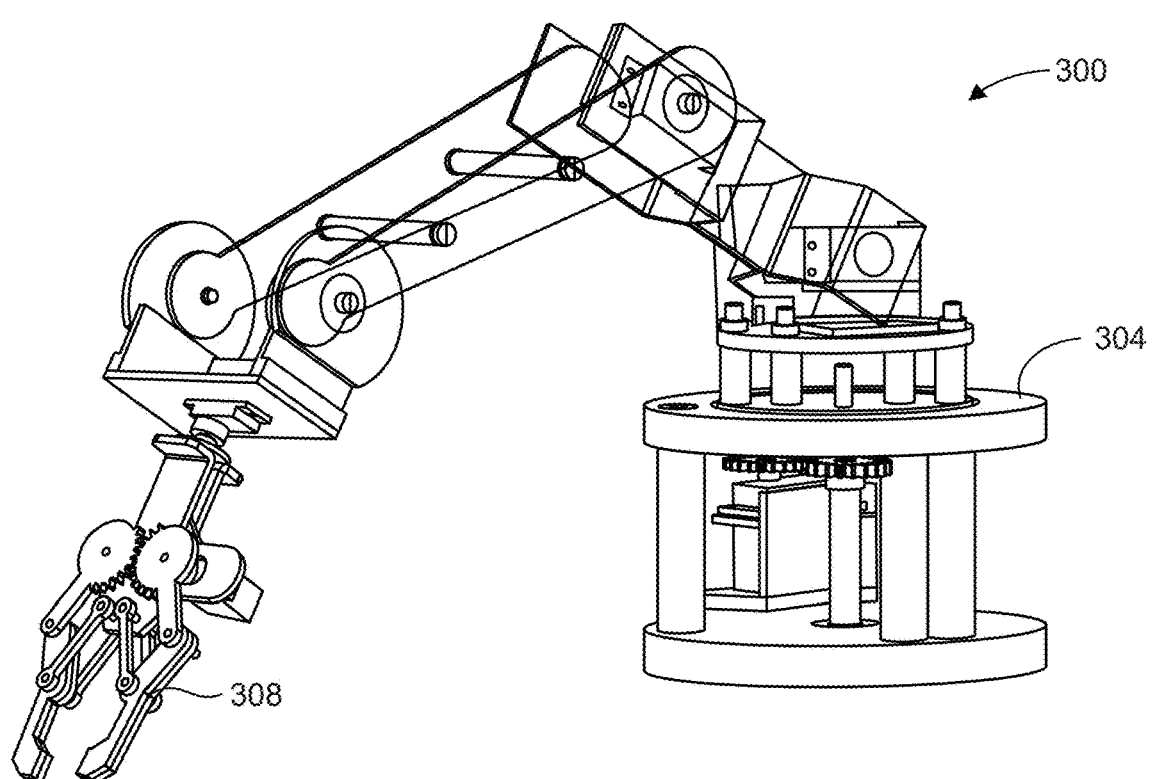
FIGS. 3A and 3B illustrate examples of robots that are employable as a test robot or as a deployed robot.
Figure 3B:
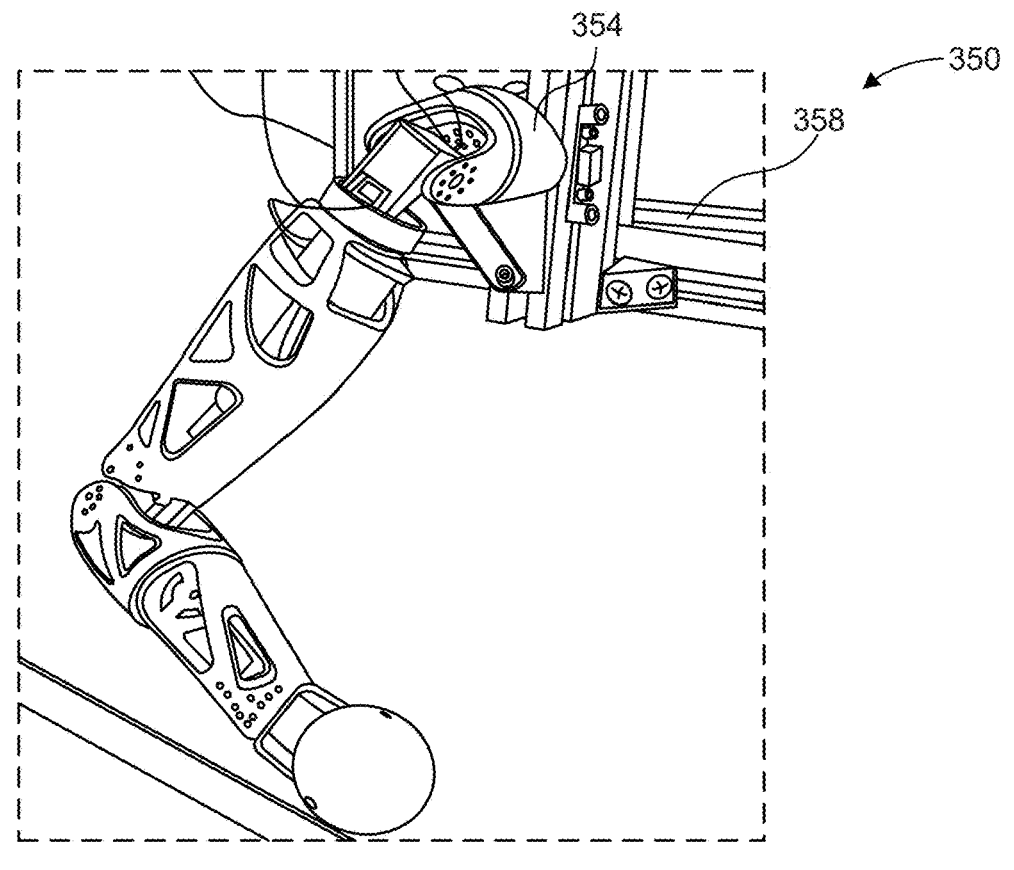

The computing platform 212 communicates with a HIVE data collector 230 via the network 226. The HIVE data collector 230 communicates with a HIVE 234 that includes a test robot 236 operating therein. The test robot 236 includes sensors 238 and actuators 240 for interacting with an environment within the HIVE 234. The sensors 238 can include, but are not limited to cameras, proximity sensors, pressure sensors, temperature sensors, accelerometers, etc. The actuators 240 are employable to activate moveable features on the test robot 236. FIGS. 3A and 3B illustrate examples of robots that are employable within the system, such as the test robot 236 of FIG. 2 and/or a deployed robot within the environment of operation 204. More specifically, FIG. 3A illustrates a robot 300 with a pedestal 304 and a grasping hand 308 that is controllable with actuators. Sensors coupled to the robot 300 are employable to provide information about the environment sensed by the robot 300. FIG. 3B illustrates a robot 350 with an arm 354 mounted on a rail 358. The rail 358 enables additional axes of movement for the arm 354. The robot 300 of FIG. 3A and the robot 350 of FIG. 3B are employable to execute different robot tasks.

Referring back to FIG. 2, the HIVE 234 provides a test environment for training the test robot 236. The HIVE data collector 230 represents a computing platform (or multiple computing platforms) for storing information characterizing observed conditions and operations within the HIVE 234. The HIVE 234 is employable to input multi-dimensional training skills data into the HIVE data collector 230.

The HIVE 234 allows for a link between a real-time environment and a virtual environment. By immersing and comingling both the test robot 236 and physical equipment within the HIVE 234 along with interactions between the physical equipment and the test robot 236 in a virtual environment, data is collected by the HIVE data collector 230 that fully characterizes an interface between the test robot 236 and parts of the physical equipment. Table 1 includes a list of features that are recorded in the HIVE 234 for each identified object within the HIVE 234 (e.g., physical equipment and the test robot 236). The list of features in Table 1 is not meant to be exhaustive.

TABLE 1

| RECORDED FEATURES IN HIVE | |
|---|---|
| 1 | Geo Position Video |
| 2 | Geo Reference Environment |
| 3 | Position Data |
| 4 | Rate of change of position |
| 5 | Object volume, object volume change |
| 6 | Object velocity, object velocity change |
| 7 | Object vector corrdinates |
| 8 | Size of robot |
| 9 | Physical and environmental contraints |

This information is employable to tune robot tasks. For example, the HIVE 234 is employable to tune a robot task for a drive motor for a wheel based on numerous trials (e.g., thousands or even millions of trials) based on evolutions and experiences in the HIVE 234. During these trials, numerous instances of extraneous stimuli are applied to the test robot 236 in order to emulate the environment of operation 204. For example, during the trials, the test robot 236 may be hit with a blunt object to emulate a rock hitting a robot in the environment of operation 204. Similarly, a temperature of the HIVE 234 is adjusted to simulate a change in temperature of the environment of operation 204. Data for these robot tasks is collected by the HIVE data collector 230 and provided to the computing platform 212 through the network 226.

The memory 216 of the computing platform 212 includes a robot intelligence engine 244. The robot intelligence engine 244 is configured/programmed to deploy robots within the environment of operation 204 to execute robot tasks based in part on data received from the HIVE data collector 230. More specifically, the robot intelligence engine 244 includes HIVE data 248. The HIVE data 248 represents raw HIVE data that is collected for further subsequent data processing. The raw data stored as the HIVE data 248 is archived separately to prevent subsequent processing preventing the corruption of the raw data. In some examples, the HIVE data 248 is captured as different sessions as opposed to one appended database.

The HIVE data 248 is provided to a data parser 250. The data parser 250 parses the HIVE data 248 into usable data elements. For example, the HIVE data 248 can be parsed into K number of different robot skills, where K is an integer greater than or equal to one. The K number of robot skills can include, but are not limited to primitive tasks such as tightening and/or loosen fasteners, connecting and/or disconnect wiring connectors, operating particular tools (e.g., laser cutter, saw, wrench, screwdriver etc.). The parsing of the HIVE data 248 into classifications is employable to execute a different repair. For instance, the individual robot skills can be combined to execute a robot task. The K number of robot skills extrapolated by the data parser 250 are stored in an archive database (DB) 252.

The robot intelligence engine 244 includes a supervised learning database 256 that stores R number of robot tasks executable by the test robot 236, where R is an integer greater than or equal to one. Each of the R number of robot tasks is comprised of one or more of the K number of robot skills. In many instances, the R number of robot tasks represents a combination of robot skills needed to complete a particular task.

The R number of robot tasks are based on the HIVE data 248. The R number of robot tasks stored in the supervised learning database 256 can be determined by a neural network or other machine learning algorithm operating on the robot intelligence engine 244 and/or the HIVE data collector 230. As some examples, the R number of robot tasks can include a robot task for replacing a wheel. Learned experiences may contain various wheel repair procedures. The specific wheel repair learned information is then provided to the supervised learning database 256 in the HIVE data 248. In such a situation, the supervised learning database 256 can collect learned experiences from external environments such as various HIVEs 234 that are included in another HIVE skill database 258. In this manner, the robot intelligence engine 244 adds robot skills from other instances of the HIVE 234 to the robot skills stored in the supervised learning database 256.

As noted, the environment of operation 204 includes deployed robots. More specifically, the environment of operation 204 includes J number of deployed robots, where J is an integer greater than or equal to one. In the example illustrated, the environment of operation 204 includes a problem detecting robot (one of the J number of robots). The problem detecting robot 262 includes sensors 264 and actuators 266. In some examples, the sensors 264 and/or the actuators 240 can be a subset of the sensors 238 and/or the actuators 240, respectively of the test robot 236.

In the example provided, the problem detecting robot 262 employs the sensors 264 (or some subset thereof) and/or sensors from other nearby robots to obtain reading inputs in order to detect and locate a problem, and an area in which the problem exists. The sensors 264 can include, for example, cameras, electronic sensors, etc., similar to the sensors 238 of the test robot 236. The sensor data capturing the problem is sent to the robot intelligence engine 244. Moreover, in some examples, additional sensor data is collected until the robot intelligence engine 244 has sufficient information to identify the problem. In a second example (hereinafter, "the second example"), suppose that the problem detecting robot 262 detects a slower than nominal moving speed along with excessive power drain in a front left wheel motor (e.g., a motor in a rover, such as a Mars rover or a moon rover). In the second example, the problem detecting robot 262 swivels a camera (e.g., one of the sensors 264) to the area of the front left wheel. In this case of the second example, the problem detecting robot 262 is configured to determine if the wheel is damaged or stuck on debris. If the sensors 264 (e.g., cameras) detect no observable abnormalities, the problem detecting robot 262 switches to another sensor 264 in order to collect additional data.

The data collected by the problem detecting robot 262 is provided to a problem cause engine 270 of the robot intelligence engine 244. In response, the problem cause engine 270 diagnoses the problem. More specifically, as the problem cause engine 270 receives a stream of data from the problem detecting robot 262, the problem cause engine 270 conducts an evaluation and will start to characterize the data collected from the robot to determine a cause (alternatively referred to as a root cause) of the problem detected by the problem detecting robot 262. In particular, in the second example, the problem cause engine 270 can evaluate an image of the problem to determine which part(s) of the front left drive train is damaged. For instance, in the second example, the problem cause engine 270 can determine if the problem is caused by the wheel, a drive motor, a steering motor, a left wheel arm, etc. The problem cause engine 270 can implement a machine learning based algorithm, such as a neural network (e.g., for image recognition) and/or a nearest neighbor algorithm. Continuing with the second example, suppose that the problem cause engine 270 determines that both the front left wheel and the left wheel arm are bent beyond designed tolerance. In response to determining the cause of the problem, the cause of the problem is provided to a supervised solution engine 272.

The supervised solution engine 272 examines the problem provided by the problem cause engine 270 and searches each robot task stored in the supervised learning database 256 to determine if a subset of the R number of robot tasks stored in the supervised learning database 256 at least partially addresses the problem. If a subset of the robot tasks partially or directly addresses the problem, the supervised solution engine 272 provides the subset of the robot tasks to a solution simulator 274. Continuing with the second example, the result is such that the broken wheel is removed and a spare wheel installed. However, in the second example, suppose that the supervised learning database 256 does not include a repair procedure for the wheel arm. The subset of robot tasks is provided to a solution simulator 274.

The solution simulator 274 implements AI algorithms, such as reinforcement learning to simulate a robot (or multiple robots) implementing each task in the subset of robot tasks to determine a likelihood of success of each such task. More specifically, the solution simulator 274 evaluates each robot task in the subset of robot tasks and executes numerous simulation scenarios applying reinforcement learning (and/or another AI technique) to tune a solution space based on criteria such as tools/spare parts availability, time availability, energy consumption/availability, repair success chance, impact to mission success, etc.

Stated differently, the solution simulator 274 receives the subset of robot tasks (e.g., repair options) along with unsupervised learned experience based on previous successful repairs from each of the J number of deployed robots. In response, the AI algorithm executed by the solution simulator 274 can run millions of simulation scenarios applying various combinations of arm-only and wheel only repair procedures (e.g. arm repair, arm bending, arm soldering, etc.) to derivate various unsupervised robot tasks that have not previously been available (and/or even conceived) in the supervised learning database 256. The unsupervised robot tasks are modified versions of the robot tasks stored in the supervised learning database 256. The AI algorithm of the solution simulator 274 employs criteria such as tools/spare parts availability, time availability, energy consumption/availability, repair success percentage, impact to mission success, etc. to evaluate the results. In this manner, execution of the AI algorithm can provide additional unsupervised learned scenarios thereby providing unsupervised robot tasks not previously available in the supervised learning database 256. These unsupervised robot tasks are stored an in an unsupervised learning database 276. In some examples, these unsupervised robot tasks are provided to the HIVE data collector 230, so that the HIVE data collector 230 can instantiate conditions within the HIVE 234 to emulate conditions present for the unsupervised solutions stored in the unsupervised learning database 276. The subset of robot tasks and the unsupervised robot tasks are provided to a solution selector 278.

The solution selector 278 receives the subset of robot tasks, along with the generated unsupervised robot tasks and the solution selector employs an AI algorithm (e.g., a rules-based engine) and ranks the robot tasks from the supervised learning database 256 and the unsupervised robot tasks based on criteria such as tools/spare parts availability, time availability, energy consumption/availability, likelihood of success percentage, impact to mission success, etc. The solution selector 278 selects the top ranked solution and provides the selected robot task to a solution operation control 280.

In response to the selected robot task, the solution operation control 280 prioritizes the selected robot task with any other needed and/or on-going repairs and prioritizes each such solution based on criticality. Stated differently, the solution operation control 280 determines a priority of the selected robot task relative to other robot tasks that are being executed contemporaneously with the selected robot task. For example, a robot arm (or arms) must be repaired prior to execution of any other solutions that require the use of the robot arm. In an alternative situation, if the selected robot task includes repairs to both a solar panel and a saw cutter, the solar panel would have a higher priority for repair. The top prioritized robot task is provided to a robot deployment engine 282.

In response to the top prioritized robot task, the robot deployment engine 282 determines a most capable robot of the J number of deployed robots. The most capable robot can be based on geographic proximity, tool availablity, a status of the J number of robots, etc. Stated differently, the robot deployment engine selects a particular deployed robot from a plurality of robots based on a geographic proximity of the selected deployed robot relative to a geographic location of the detected problem, a suitability of the selected deployed robot to remedy the problem and a criticality of the problem detected. For example, the robot nearest the problem may not have the tools or spare parts to perform the repair, or the robot nearest the problem may have damaged arms. In the example where the robot nearest the problem as damaged arms, a robot second closest to the problem could be assigned the top priority robot task of repairing the arm of the robot closest to the problem. Further, in a situation where there is no robot available for deployment (e.g., all robots are busy with other robot tasks), a waitlist can be generated. Additionally, some problems can be completed by two or more deployed robots working in concert, such that the most capable robot corresponds to multiple robots. In such a situation, the deployed robot 286 is representative of multiple deployed robots, and each such robot is assigned a portion of the selected robot task.

In response to identifying the most capable robot, namely a deployed robot 286, the top prioritized robot task is assigned and provided to the deployed robot 286. The deployed robot 286 includes sensors 288 and actuators 290, which are similar to the sensors 238 and the actuators 240 of the test robot 236. In response to the top prioritized task, the deployed robot 286 executes the assigned robot task (e.g., the top prioritized robot task). Once the assigned robot task is successfully executed and if the repair was an unsupervised robot task, the assigned robot task is sent to the HIVE data collector 230 for evaluation in the HIVE 234. At a subsequent time, the HIVE data collector 230 can validate and tune the unsupervised robot task, thereby converting the unsupervised robot task into a supervised robot task for storage in the supervised learning database 256. Conversely, if the deployed robot 286 is not successful at remedying the problem, the assigned robot task is also sent back to the HIVE data collector 230, where the assigned robot task can be virtually analyzed, modified, and potentially become a new supervised robot task for storage in the supervised learning database 256.

By employing the system 200, robots operating in the environment of operation 204 can be assigned to execute specific robot tasks to remedy problems. For instance, suppose a new filter has been provisioned on the aforementioned rover of the second example. Further, suppose that not all filters are the same size due to a manufacturer's dimensional tolerance. In this case, the robot intelligence engine 244 can generate a new unsupervised robot task using the new filter by modifying a supervised robot task (stored in the supervised learning database 256) that uses an old filter and assigns the unsupervised robot task to the deployed robot 286. Subsequently, in response to installation of the new filter, the deployed robot 286 provides feedback to the HIVE data collector 230 characterizing the unsupervised robot task. In response, the HIVE data collector 230 sets conditions in the HIVE 234 to emulate the conditions of the environment of operation 204 and have the test robot 236 execute the unsupervised robot task to ultimately tune and convert the unsupervised task into a supervised robot task stored in the supervised learning database 256.

Figure 4:
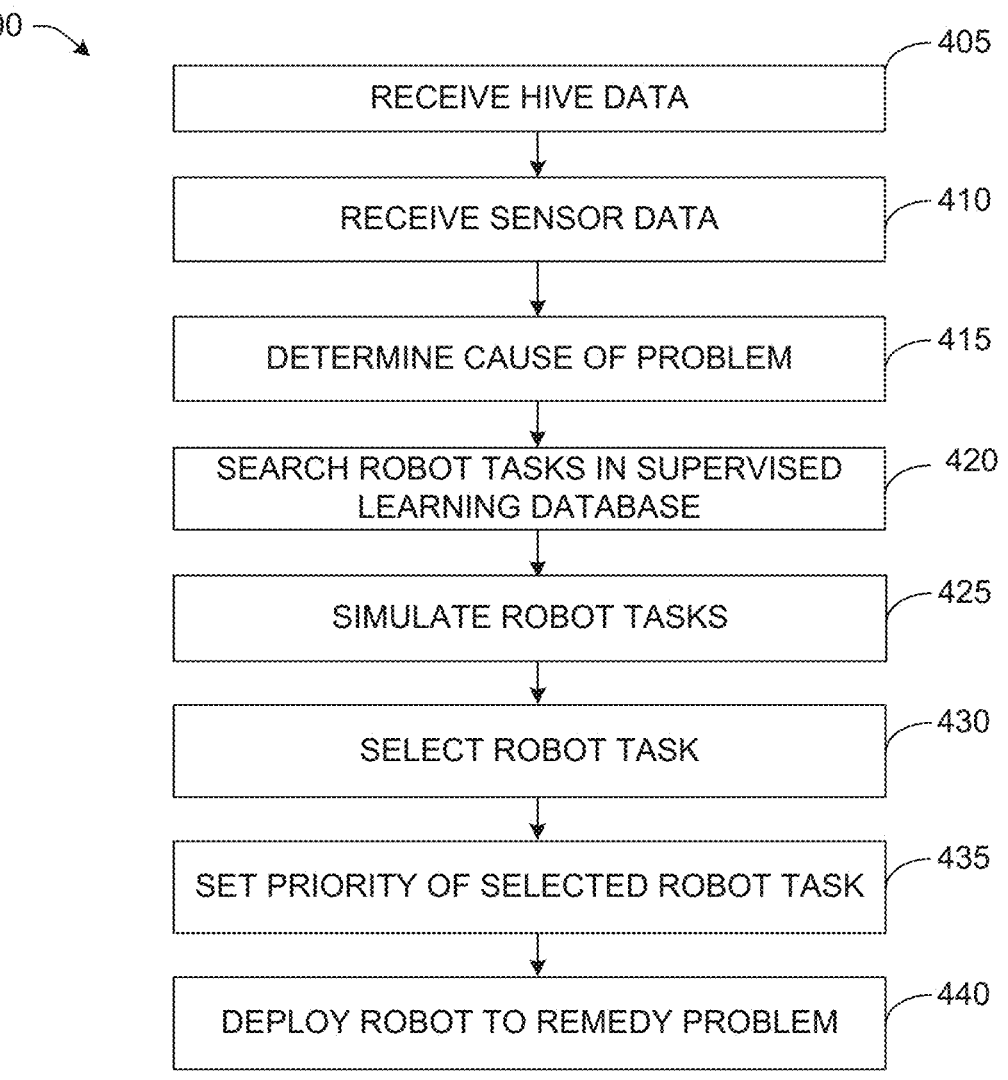
FIG. 4 illustrates a flowchart for an example method for controlling robots deployed in an environment of operation that is inhospitable to human life.

In view of the foregoing structural and functional features described above, example methods will be better appreciated with reference to FIG. 4. While, for purposes of simplicity of explanation, the example method of FIG. 4 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 4 illustrates a flowchart for an example method 400 for controlling robots deployed in an environment of operation (e.g., the environment of operation 104 of FIG. 1 and/or the environment of operation 204 of FIG. 2). The method 400 can be implemented with a robot intelligence engine, such as the robot intelligence engine 108 of FIG. 1 and/or the robot intelligence engine 244 of FIG. 2. The robot intelligence engine operates on a computing platform (e.g., the computing platform 212 of FIG. 2). The robot intelligence engine is proximal to (or within the boundaries of) the environment of operation.

At 405, the robot intelligence engine receives HIVE data characterizing a set of robot tasks executed by a test robot in a HIVE. The robot tasks include at least one robot skill. The HIVE data can be provided from a HIVE data collector (e.g., the HIVE data collector 230 of FIG. 2) linked to the HIVE. At 410, the robot intelligence engine receives sensor data from a problem detecting robot (e.g., the problem detecting robot 262 of FIG. 2) deployed in an environment of operation that characterizes conditions corresponding to a detected problem. At 415, the robot intelligence engine determines a cause (e.g., a root cause) of the problem based on the sensor data provided from the problem detecting robot. At 420, the robot intelligence engine searches a supervised learning database (e.g., the supervised learning database 256 of FIG. 2) for a subset of robot tasks stored in the supervised learning database that will remedy the problem detected. At 425, the robot intelligence engine simulates the subset of robot tasks and the set of unsupervised robot tasks to determine a likelihood of success for the subset of robot tasks. In some examples, such simulation generates a set of unsupervised robot tasks that are employable to remedy the detected problem. The unsupervised robot tasks are modifications of the robot tasks stored in the supervised learning database. Additionally, the unsupervised robot tasks are stored in an unsupervised learning database.

At 430, the robot intelligence engine selects one of the subset of robot tasks or one of the unsupervised robot tasks to determine a selected robot task for remedying the detected problem. The selection of the robot task is based on a ranked order of the subset of robot tasks and the unsupervised robot tasks. At 435, the robot intelligence engine sets a priority of the selected robot task, relative to other already assigned robot tasks that are being executed contemporaneously. At 440, the robot intelligence engine provides the selected robot task to a selected deployed robot causing the selected deployed robot to remedy the problem.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system for controlling operations of robots comprising:

a non-transitory memory for storing machine-readable instructions; and a processing unit that accesses the memory to execute the machine-readable instructions to implement:

a robot intelligence engine that:

communicates with a highly immersive virtual environment (HIVE) data collector to receive HIVE data characterizing a set of robot tasks executed by a test robot in a HIVE representative of an environment of operation, wherein the robot tasks of the set of robot tasks include at least one robot skill, and wherein the HIVE data is collected by the HIVE data collector from the HIVE;

stores the set of robot tasks in a database;

receives sensor data from a problem detecting robot remotely deployed in the environment of operation;

evaluates the sensor data to determine a cause of a problem detected by the problem detecting robot;

searches the set of robot tasks to identify a subset of the robot tasks that are potentially employable to remedy the detected problem;

simulates the subset of robot tasks to determine a likelihood of success for the subset of robot tasks, wherein the simulating generates a set of unsupervised robot tasks that are potentially employable to remedy the detected problem, the set of unsupervised robot tasks are modified versions of the subset of robot tasks;

selects one of the unsupervised robot tasks to determine a selected robot task for remedying the detected problem;

selects a robot from a plurality of robots in the environment of operation for executing the selected robot task after the simulation provides the selected robot task to the selected robot operating in the environment of operation to cause the selected robot to execute the selected robot task to attempt to remedy the problem; and wherein the HIVE data collector:

sets conditions in the HIVE to emulate conditions of the environment of operation in response to determining that the selected robot task was successfully executed by the selected robot deployed in the environment to remedy the problem based on feedback data, the feedback data characterizing the selected robot task and is provided by the selected robot;

instructs the test robot in the HIVE to execute the selected robot task; and tunes and validates the selected robot task based on data collected from the execution by the test robot to convert the selected robot task into a supervised robot task, the supervised robot task being stored in the database and wherein the robot intelligence engine provides the supervised robot task to a respective robot of the plurality of robots to cause mechanical features of the respective robot to perform a physical operation of the supervised robot task to remedy a detected problem in the environment of operation.

2. The system of claim 1, wherein the selected robot and the problem detecting robot are a same robot.

3. The system of claim 1, wherein the selected robot and the problem detecting robot are different robots.

4. The system of claim 1, wherein the robot intelligence engine selects the selected robot from the plurality of robots after the simulation based on a geographic proximity of the selected robot relative to a geographic location of the detected problem, a suitability of the selected robot to remedy the problem and a criticality of the problem detected.

5. The system of claim 1, wherein the robot intelligence engine determines a priority of the selected robot task relative to other robot tasks that are being executed contemporaneously with the selected robot task.

6. The system of claim 5, wherein the robot intelligence engine selects at least two different robots from the plurality of robots after simulation, each of the at least two different robots executing a portion of the selected robot task.

7. The system of claim 1, wherein the selected robot provides feedback to the HIVE data collector that monitors operations of the HIVE, the feedback characterizing the selected robot task and data characterizing an attempt at executing the selected robot task.

8. The system of claim 1, wherein the robot intelligence engine adds robot tasks to the set of robot tasks based on data characterizing a set of robot tasks executed by another test robot in another HIVE.

9. The system of claim 1, wherein the environment of operation is extraterrestrial.

10. The system of claim 9, wherein the HIVE is operating on earth.

11. A non-transitory machine-readable medium storing instructions that, when executed by a processor, cause the processor to implement-a robot intelligence engine that:

communicates with a highly immersive virtual environment (HIVE) data collector to receive HIVE data characterizing a set of robot tasks executed by a test robot in a HIVE representative of an environment of operation, wherein the robot tasks of the set of robot tasks include at least one robot skill, and wherein the HIVE data is collected by the HIVE data collector from the HIVE;

stores the set of robot tasks in a database;

receives sensor data from a problem detecting robot remotely deployed in the environment of operation;

evaluates the sensor data to determine a cause of a problem detected by the problem detecting robot;

searches the set of robot tasks to determine if a subset of the robot tasks are potentially employable to remedy the detected problem;

simulates the subset of robot tasks to determine a likelihood of success for the subset of robot tasks, wherein the simulation generates a set of unsupervised robot tasks that are potentially employable to remedy the detected problem, the set of unsupervised robot tasks are modified versions of the subset of robot tasks;

selects one of the unsupervised robot tasks to determine a selected robot task for remedying the detected problem;

selects a robot from a plurality of robots in the environment of operation for executing the selected robot task after the simulation; and provides the selected robot task to the selected robot operating in the environment of operation to cause the selected robot to execute the selected robot task to attempt to remedy the problem; and wherein the HIVE data collector:

sets conditions in the HIVE to emulate conditions of the environment of operation in response to determining that the selected robot task was successfully executed by the selected robot deployed in the environment to remedy the problem based on feedback data, the feedback data characterizing the selected robot task and is provided by the selected robot;

instructs the test robot in the HIVE to execute the selected robot task; and tunes and validates the selected robot task based on data collected from the execution by the test robot to convert the selected robot task into a supervised robot task, the supervised robot task being stored in the database; and providing the supervised robot task to a respective robot of the plurality of robots to cause mechanical features of the respective robot to perform a physical operation of the supervised robot task to remedy a detected problem in the environment of operation.

12. The non-transitory machine-readable medium of claim 11, wherein the selected robot has a set of actuators corresponding to the mechanical features and a set of sensors.

13. The non-transitory machine-readable medium of claim 11, wherein the environment of operation is extraterrestrial, and the HIVE is operating on earth.

14. The non-transitory machine-readable medium of claim 11, wherein the robot intelligence engine selects the selected robot from the plurality of robots based on a geographic proximity of the selected robot relative to a geographic location of the detected problem, a suitability of the selected robot to remedy the problem and a criticality of the problem detected.

15. The non-transitory machine-readable medium of claim 11, wherein the robot intelligence engine determines a priority of the selected robot task relative to other robot tasks that are being executed contemporaneously with the selected robot task.

16. The non-transitory machine-readable medium of claim 15, wherein the robot intelligence engine selects at least two different robots from the plurality of robots, each of at least two different robots executing a portion of the selected robot task.

17. The non-transitory machine-readable medium of claim 11, wherein the robot intelligence engine adds robot tasks to the set of robot tasks based on data characterizing a set of robot tasks executed by another test robot in another HIVE.

18. A method comprising:

communicating with a highly immersive virtual environment (HIVE) data collector to receive HIVE data characterizing a set of robot tasks executed by a test robot in a HIVE representative of an environment of operation, wherein the robot tasks of the set of robot tasks include at least one robot skill, and wherein the HIVE data is collected by the HIVE data collector from the HIVE;

storing the set of robot tasks in a database;

receiving sensor data from a problem detecting robot remotely deployed in the environment of operation;

evaluating the sensor data to determine a cause of a problem detected by the problem detecting robot;

searching the set of robot tasks to identify a subset of the robot tasks that are potentially employable to remedy the detected problem;

simulating the subset of robot tasks to determine a likelihood of success for the subset of robot tasks, wherein the simulating generates a set of unsupervised robot tasks that are potentially employable to remedy the detected problem, the set of unsupervised robot tasks are modified versions of the subset of robot tasks;

selecting one of the unsupervised robot tasks to determine a selected robot task for remedying the detected problem;

selecting a robot from a plurality of robots in the environment of operation for executing the selected robot task after the simulation;

providing the selected robot task to the selected robot operating in the environment of operation to cause the selected robot to execute the selected robot task to attempt to remedy the problem;

setting, using the HIVE data collector, conditions in the HIVE to emulate conditions of the environment of operation in response to determining that the selected robot task was successfully executed by the selected robot deployed in the environment to remedy the problem based on feedback data, the feedback data characterizing the selected robot task and is provided by the selected robot;

instructing, using the HIVE data collector, the test robot in the HIVE to execute the selected robot task;

tuning and validating, using the HIVE data collector, the selected robot task based on data collected from the execution by the test robot to convert the selected robot task into a supervised robot task, the supervised robot task being stored in the database; and providing the supervised robot task to a respective robot of the plurality of robots to cause mechanical features of the respective robot to perform a physical operation of the supervised robot task to remedy a detected problem in the environment of operation.

19. The method of claim 18, wherein the environment of operation is extraterrestrial and the HIVE is operating on earth.

20. The method of claim 19, further comprising selecting, by the robot intelligence engine, the selected robot from the plurality of robots based on a geographic proximity of the selected robot relative to a geographic location of the detected problem, a suitability of the selected robot to remedy the problem and a criticality of the problem detected.

21. The system of claim 1, wherein the selected robot is selected as a most capable robot based on a geographic proximity to the problem, a tool availability, or a status of the plurality of robots.

22. The system of claim 1, wherein the robot intelligence engine ranks the subset of robot tasks and the unsupervised robot tasks based on ranking criteria to provide a robot task ranking list and selects a top ranked robot task from the robot task ranking list to provide the selected robot task, the ranking criteria comprising tools and/or spare parts availability, robot time availability, robot energy consumption, and/or the likelihood of success in remedying the problem.

* * * * *